(12) United States Patent
Nickel et al.

(10) Patent No.: US 9,487,173 B2
(45) Date of Patent: Nov. 8, 2016

(54) MOLDING FOR A MOTOR VEHICLE FOR TRANSMITTING AN IMPACT FORCE TO A HOOD SENSOR

(71) Applicant: GM GLOBAL TECHNOLOGY OPERATIONS LLC, Detroit, MI (US)

(72) Inventors: Marco Nickel, Riedstadt (DE); Eduard Goebel, Nastaetten (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/530,182

(22) Filed: Oct. 31, 2014

(65) Prior Publication Data

US 2015/0114746 A1   Apr. 30, 2015

(30) Foreign Application Priority Data

Oct. 31, 2013   (DE) .................. 10 2013 018 323

(51) Int. Cl.
| | | |
|---|---|---|
| *B60R 21/0136* | (2006.01) | |
| *B60R 13/04* | (2006.01) | |
| *B60R 19/48* | (2006.01) | |
| *B60R 21/00* | (2006.01) | |
| *B60R 19/52* | (2006.01) | |

(52) U.S. Cl.
CPC ........... *B60R 21/0136* (2013.01); *B60R 13/04* (2013.01); *B60R 19/483* (2013.01); *B60R 2019/525* (2013.01); *B60R 2021/0004* (2013.01)

(58) Field of Classification Search
CPC . B60R 19/483; B60R 21/0136; B60R 13/03; B60R 2021/0004; B60R 2019/525
See application file for complete search history.

(56) References Cited

U.S. PATENT DOCUMENTS

| | | | |
|---|---|---|---|
| 4,995,639 A * | 2/1991 | Breed ........................... | 280/735 |
| 6,516,278 B1 | 2/2003 | Ishizaki et al. | |
| 7,293,809 B2 | 11/2007 | Suzuki et al. | |
| 7,733,219 B2 | 6/2010 | Kamei et al. | |
| 8,651,558 B2 | 2/2014 | Lee | |
| 2005/0200139 A1* | 9/2005 | Suzuki ........................ | 293/117 |
| 2006/0185923 A1* | 8/2006 | Tanabe ........................ | 180/274 |
| 2007/0046044 A1* | 3/2007 | Tanabe ........................ | 293/120 |
| 2007/0114803 A1* | 5/2007 | Takahashi et al. ........... | 293/102 |
| 2007/0132565 A1* | 6/2007 | Tanabe ........................ | 340/436 |
| 2007/0179693 A1* | 8/2007 | Dukart et al. ................. | 701/45 |
| 2007/0227797 A1* | 10/2007 | Takahashi et al. ........... | 180/274 |

(Continued)

FOREIGN PATENT DOCUMENTS

| | | |
|---|---|---|
| DE | 2259620 A1 | 6/1974 |
| DE | 102006051749 A1 | 5/2007 |

(Continued)

OTHER PUBLICATIONS

Great Britain Patent Office, Great Britain Search Report for Great Britain Application No. 1418252.1, dated Apr. 1, 2015.

*Primary Examiner* — Drew Brown
(74) *Attorney, Agent, or Firm* — Lorenz & Kopf LLP

(57) ABSTRACT

A hood sensor assembly of a motor vehicle includes a molding for transmitting an impact force to a hood sensor. The molding includes an absorption area for absorbing an impact force and a transmission section for transmitting at least a portion of the impact force to a hood sensor. An elastically movable material section provides a restoring force against which the molding can be arranged in its installation position (E). The hood sensor is supported within the molding.

14 Claims, 4 Drawing Sheets

(56) References Cited

U.S. PATENT DOCUMENTS

| | | | |
|---|---|---|---|
| 2008/0203742 A1* | 8/2008 | Takahashi | 293/117 |
| 2009/0019940 A1* | 1/2009 | Suzuki et al. | 73/800 |
| 2009/0027181 A1* | 1/2009 | Tanabe et al. | 340/436 |
| 2009/0038403 A1* | 2/2009 | Kamei et al. | 73/774 |
| 2010/0038922 A1* | 2/2010 | Takahashi et al. | 293/117 |
| 2011/0018309 A1* | 1/2011 | Mikutsu | 296/187.11 |
| 2012/0319413 A1* | 12/2012 | Andres et al. | 293/133 |

FOREIGN PATENT DOCUMENTS

| | | |
|---|---|---|
| DE | 102008022632 A1 | 11/2009 |
| DE | 102011055331 A1 | 5/2013 |
| GB | 1293299 A | 10/1972 |

* cited by examiner

MOLDING FOR A MOTOR VEHICLE FOR TRANSMITTING AN IMPACT FORCE TO A HOOD SENSOR

CROSS REFERENCE TO RELATED APPLICATION

This application claims priority to German Patent Application No. 102013018323.5 filed Oct. 31, 2013, which is incorporated herein by reference in its entirety.

TECHNICAL FIELD

The present disclosure pertains to a molding for a motor vehicle for transmitting an impact force to a hood sensor. The molding features an absorption area for absorbing an impact force and a transmission section for transmitting at least a portion of the impact force to a hood sensor.

BACKGROUND

Moldings of this type are used, for example, in motor vehicles and cooperate with a hood sensor. The moldings serve for transmitting an impact force to the hood sensor. If the motor vehicle collides with a pedestrian, the impact energy acts upon the hood sensor via the molding such that this hood sensor is mechanically triggered and the hood of the motor vehicle is raised. Such a vehicle hood is also referred to as an active hood and serves as a protective measure for reducing the risk of injuries, in particular, to the head of a pedestrian during a collision with the motor vehicle.

The hood sensors are usually implemented in absorber structures that lie in the load path of the bumper system of a motor vehicle. In case of a collision, the absorber structures act upon, for example, a cross member of the bumper system. Until now, the absorber structures were installed at a distance from the cross member in order to prevent noise from developing, e.g. due to potential rattling of the absorber structure against the cross member, and vibrations from being transmitted while the vehicle is in motion. In this respect, the hood sensor is also arranged at a distance from the cross member, against which it impacts and is triggered in case of a collision. This in turn causes a time-delayed response of the hood sensor in case of a collision.

SUMMARY

An embodiment of the present disclosure therefore is based on the objective of making available a molding with the initially cited characteristics that allows an early response of the hood sensor in case of a collision, for example, with a pedestrian.

A molding for a motor vehicle for transmitting an impact force to a hood sensor features an absorption area for absorbing an impact force and a transmission section for transmitting at least a portion of the impact force to a hood sensor. The molding is particularly dimensioned such that the permissible injury values during a collision with a pedestrian are not exceeded due to the absorbed impact force. The molding additionally features at least one elastically movable material section, against the restoring force of which the molding can be arranged in its installation position.

Due to the elastically movable material section, the molding may be in contact with a vehicle component or a vehicle body component in its installation position without developing noise and/or transmitting vibrations while the vehicle is in motion, namely because the molding presses against the vehicle body component or the vehicle component with its pre-stressed material section in the installed state. Consequently, a hood sensor arranged on the molding can be positioned near the vehicle body component or the vehicle component or even be in contact with the vehicle body component or the vehicle such that an early response of the hood sensor is ensured in case of a collision. With respect to the positioning of the hood sensor, it merely needs to be ensured that vibrations generated while the vehicle is in motion do not cause the hood sensor to be triggered. In order to optimally utilize the effect of the elastically movable material section for the hood sensor, it is advantageous that the material section is oriented in the effective direction of the transmission section and, in particular, protrudes outward from the molding. The material section should form an integral part of the molding. In this way, the material section can be easily realized with respect to the manufacturing technology.

According to an embodiment, it is proposed that the transmission section forms at least part of an at least partially open receptacle of the molding which accommodates a hood sensor. The hood sensor is supported against a vehicle body component in the installed state of the molding. A vehicle body component includes the aforementioned vehicle body component. This measure ensures that the hood sensor reliably triggers in case of a collision because the hood sensor is pressed against the vehicle body component by means of the transmission section of the molding and consequently responds. The contact of the hood sensor with the vehicle body component is realized in that the hood sensor is only partially accommodated in the receptacle and at least partially protrudes outward, particularly facing the vehicle body component, through at least one opening due to the open design of the receptacle area According to another embodiment, at least one dimensionally stable and/or dimensionally stabilized material section is provided and protrudes laterally outward from the molding. When an impact force acts upon the molding in its installed state, this material section acts as a stop against the next vehicle body component adjoining the molding and the hood sensor in the load path in order to hold the molding in the area of its installation position, particularly for preventing or at least limiting a rotational motion of the molding relative to the vehicle body component. This ensures that the molding can also optimally act as an energy absorber in case of a collision because it remains in the area of the predefined installation position due to the immovable material section. It is advantageous that the dimensionally stable or dimensionally stabilized material section and the elastically movable material section are integrally formed on a common base section that is realized, for example, on a wall of the molding. In this way, the molding with its two material sections can be easily realized with respect to the manufacturing technology.

In another embodiment, it is proposed that the molding is realized in the form of a preferably elongate profile with an essentially C-shaped, V-shaped or similar open-ended hollow cross section. In this way, the molding has a cross-sectional contour that in case of a collision can at least partially absorb the impact energy in a particularly effective fashion. This cross-sectional contour simultaneously results in a relatively small block length because the molding can be compressed to only double the wall thickness along its hollow cross section in case of a collision. The double wall thickness is caused by the respective limb of the profile being folded at least once when a collision occurs.

According to another embodiment, this type of folding is promoted, in particular, if the absorption area is provided on the open end of the hollow cross section or in the region of this end and the elastically movable material section extends such that it faces away from the open end. The hollow cross section essentially may extend continuously in the longitudinal direction of the molding. However, the hollow cross section may also be interrupted at least once or several times in the longitudinal direction of the molding.

It is advantageous to realize the area of the open end for the connection to a vehicle component. For example, the connection may be produced with a flange on the respective end such as, for example, with an outwardly protruding material section. The connection may be produced in that the molding merely acts upon the vehicle component non-positively and, in particular, is held due to a generated pre-stress such as the pre-stress of the elastically movable material section. The connection may alternatively or additionally also be realized in the form of a positive connection with the vehicle component.

It is advantageous that the limbs of the molding realized with open-ended hollow cross section converge with a respectively predefined slope. In case of a collision, this promotes a purposeful deformation of the limbs in the form of a folding deformation, particularly if the limbs converge in the direction of the force flow referred to the impact force. The limbs may be realized in a convex fashion over at least a section of their length. This promotes the desired purposeful deformation of the cross section at its limbs and therefore the energy-absorbing effect of the molding in case of a collision.

The molding with its open-ended hollow cross section may furthermore be formed by limbs that in the area of their free ends extend obliquely outward, particularly due to another slope. This additionally reinforces or stabilizes the limbs in this area. Depending on the design of the adjacent length section of each limb, this makes it possible to purposefully adjust the deformation characteristic and the rigidity of the limbs in accordance with the design of the slope and the length section, over which the slope is realized.

It would be possible, in particular, that the limbs of the molding with hollow cross section respectively have a predefined length in a cross sectional view. For example, the limbs may differ from one another with respect to their length. The length of each limb makes it possible to purposefully adjust the resistance of the molding such that, for example, the respective energy absorption characteristic and/or energy absorption capacity or the force-displacement characteristic can be adapted to the respective requirements by choosing the length of the respective limb accordingly. In order to prevent the different lengths of the limbs from causing a rotation of the molding, for example, about its longitudinal axis when a collision occurs, the molding should feature at least one material section that serves as a stop and comes in contact with a body component of the motor vehicle when the molding begins to rotate in case of a collision. The material section may include a dimensionally stable or dimensionally stabilized material section of the above-described type. The absorption area and/or the transmission section may essentially extend continuously in the longitudinal direction of the elongate molding. In this way, impacts are detected by means of the molding over a broad area in the lateral direction of the motor vehicle and impact forces resulting thereof are transmitted to the hood sensor.

It would also be possible to provide several elastically movable material sections. The elastically movable material sections may be arranged, for example, behind one another viewed in the longitudinal direction of the elongate molding. In this way, the elongate molding is held particularly well in the installation position with the desired pre-stress. It would also be conceivable to provide an elastically movable material section that extends continuously in the longitudinal direction of the elongate molding.

According to another embodiment, the molding consists of a plastic part, particularly an injection-molded part. Such a molding can also be manufactured in a technically simple and cost-effective fashion as a mass-produced article. A thusly manufactured molding also makes it possible to realize the elastically movable material section in a technically simple fashion. The molding furthermore has a relatively low weight such that fuel savings can be realized.

The present disclosure furthermore pertains to an assembly including a molding of the above-described type and a hood sensor. According to an embodiment, it is proposed that the hood sensor includes an elastic material, particularly a rubbery-elastic material, or features such a material. The hood sensor particularly features a housing of an elastic material, particularly a rubbery-elastic material, or consists of such a material. In this way, the hood sensor or its housing acts as a damper and therefore prevents noises or vibrations from developing due to the molding, for example, while the vehicle is in motion. Such noises and vibrations may develop when the molding strikes a vehicle body component or the vehicle body component of the above-described type, against which the molding is supported via the hood sensor. The elastically movable material section of the molding and the elastic material of the hood sensor form a spring damper system that jointly acts against the vehicle body component in that the elastic material section is supported against the vehicle body component under pre-stress and the hood sensor is simultaneously also supported against the vehicle body component when the molding including hood sensor is arranged in the installation position on the motor vehicle.

The hood sensor may be realized within an elongate hollow body such as a hose. For example, the hood sensor or the housing of the hood sensor may be respectively formed by a hose, particularly a silicone hose, the interior of which is sealed relative to the outside, particularly in a hermetic fashion. The hood sensor may feature at least one sensor element in its interior in order to detect changes of the air pressure in the interior of the hood sensor. Such changes are caused when a collision occurs and an impact force acts upon the hood sensor via the molding such that the impact force deforms the housing of the hood sensor.

The present disclosure furthermore pertains to an arrangement of an assembly of the above-described type in a motor vehicle. The assembly is arranged between a vehicle body component such as a cross member of a bumper system and a vehicle component such as an air inlet structure for the vehicle radiator. The assembly is connected to the vehicle component with its absorption area and supported on the vehicle body component under pre-stress with the elastically movable material section. Although the molding contacts the vehicle body component with the elastically movable material section, the pre-stress prevents noises from being generated and vibrations from being transmitted. The pre-stressing force is particularly chosen in such a way that the externally visible joint pattern in the area of the vehicle component or air inlet structure and/or the bumper system remains unchanged due to varying component tolerances.

According to an embodiment, it is proposed that the hood sensor rests against the vehicle body component. This ensures an early response of the hood sensor in case of a collision.

Vibrations can be dampened in that the hood sensor or its housing includes an elastic material such as, for example, a rubbery-elastic material or features such a material. In this case, the hood sensor and the elastically movable material section form a spring damper system for minimal relative motions that are caused, for example, by engine vibrations while the vehicle is at a standstill.

The present disclosure furthermore pertains to a motor vehicle with a molding of the above-described type, particularly with an assembly of the above-described type in an arrangement of the above-described type.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
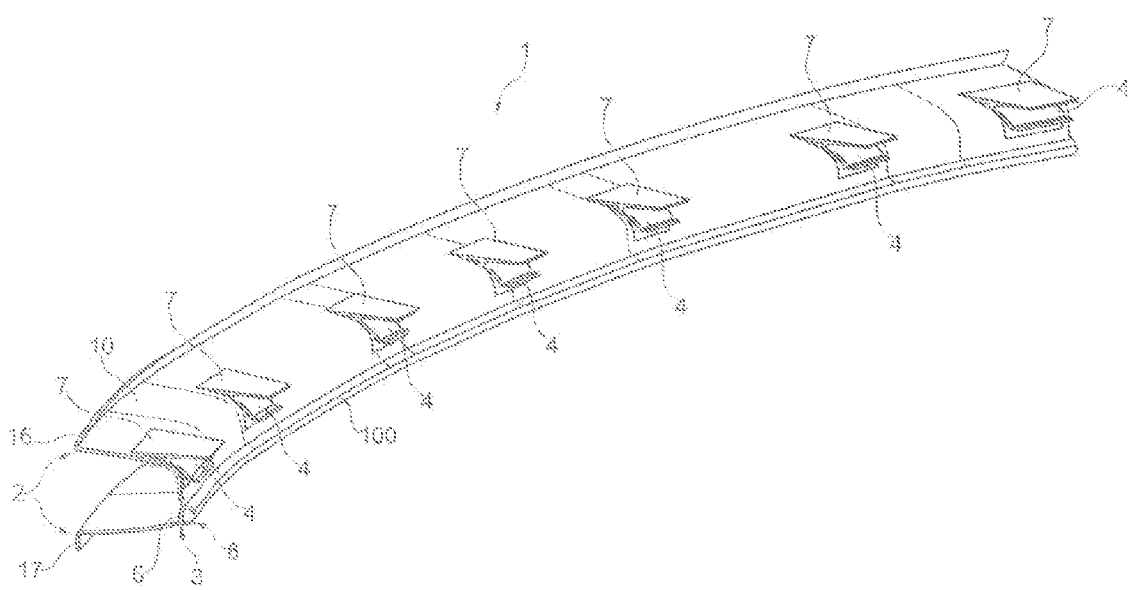
FIG. 1 shows a perspective representation of a potential embodiment of a molding for a motor vehicle for transmitting an impact force to a hood sensor.
Figure 2:
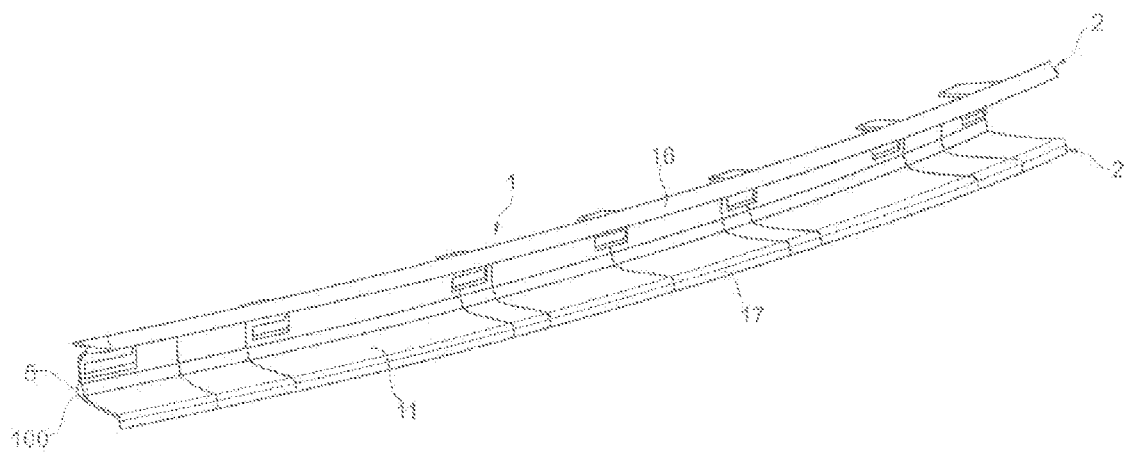
FIG. 2 shows a different perspective representation of the molding according to FIG. 1.

FIGS. 1 and 2 show—in schematic form—an embodiment of a molding 1 that serves for transmitting an impact force to a hood sensor and can be used, for example, in a motor vehicle. FIG. 1 shows the molding 1 in the form of a perspective view from the rear. FIG. 2 shows the molding 1 in the form of a perspective view from the front. The molding 1 and the hood sensor 100 jointly form an assembly, in which the hood sensor 100 is connected to the molding 1.

The molding 1 features an absorption area 2 for absorbing an impact force and a transmission section 3 for transmitting at least a portion of the impact force to the hood sensor 100. The molding 1 consists of a plastic part, for example an injection-molded plastic part.

The molding 1 is preferably realized in the form of an elongate profile with an essentially C-shaped cross section, on the open end of which the absorption area 2 is arranged and on the other end of which the transmission section 3 is realized. The molding 1 is preferably aligned such that its open end is oriented in the direction of the front or rear end of the motor vehicle. The other end of the molding 1 is oriented in the direction of the vehicle interior such that a vehicle component, for example a radiator grille, acts upon the open end of the molding 1 in case of a collision and the other cross-sectional end acts upon a body component of the motor vehicle such as, a vehicle body component of the bumper system, particularly a cross member of the bumper system, via the hood sensor 100.

The transmission section 3 of the molding 1 preferably forms part of a partially open receptacle 5, in which the hood sensor 100 respectively can be accommodated or is accommodated. The hood sensor 100 protrudes from the receptacle 5 through the opening 6 of the receptacle 5 such that the hood sensor 100 can be directly supported against a vehicle body component.

In the absorption area 2, the molding 1 may feature respective material sections 16 and 17 that protrude laterally outward on its respective limbs 10 and 11. The material sections jointly serve as a flange for being connected to and/or supported against a vehicle component. The material sections 16 and 17 may extend continuously in the longitudinal direction of the molding 1. The material sections 16 and 17 preferably are integrally formed on the respective limbs 10 and 11 of the molding 1.

An energy absorber structure is realized due to the design of the molding 1 in the form of an elongate profile with C-shaped cross section, wherein this energy absorber structure can absorb energy during an impact and simultaneously has an effective force-deformation characteristic with small block length. The C-shaped cross section of the molding 1 respectively promotes a folding deformation of the limbs 10, 11 of the molding 1 during an impact such that the cross section of the molding can be compressed to approximately double the wall thickness of the respective limb 10 or 11.

The molding 1 additionally features several elastically movable material sections 4, against the restoring force of which the molding 1 can be arranged in its installation position. The material sections 4 preferably are arranged behind one another viewed in the longitudinal direction of the molding 1 such that an essentially constant pre-stressing force is generated over the length of the molding 1 in its installed state.

FIG. 1, in particular, shows that the material sections 4 are essentially oriented in the effective direction of the transmission section 3, i.e. they protrude outward from the molding 1.

The respective elastically movable material section 4 preferably cooperates with a material section 7 that essentially is dimensionally stable and protrudes laterally outward from the molding 1. According to FIGS. 1 and 2, the material sections 4 and 7 are arranged on the limb that forms the upper limb in the installed state, namely on the limb 10.

Figure 3:
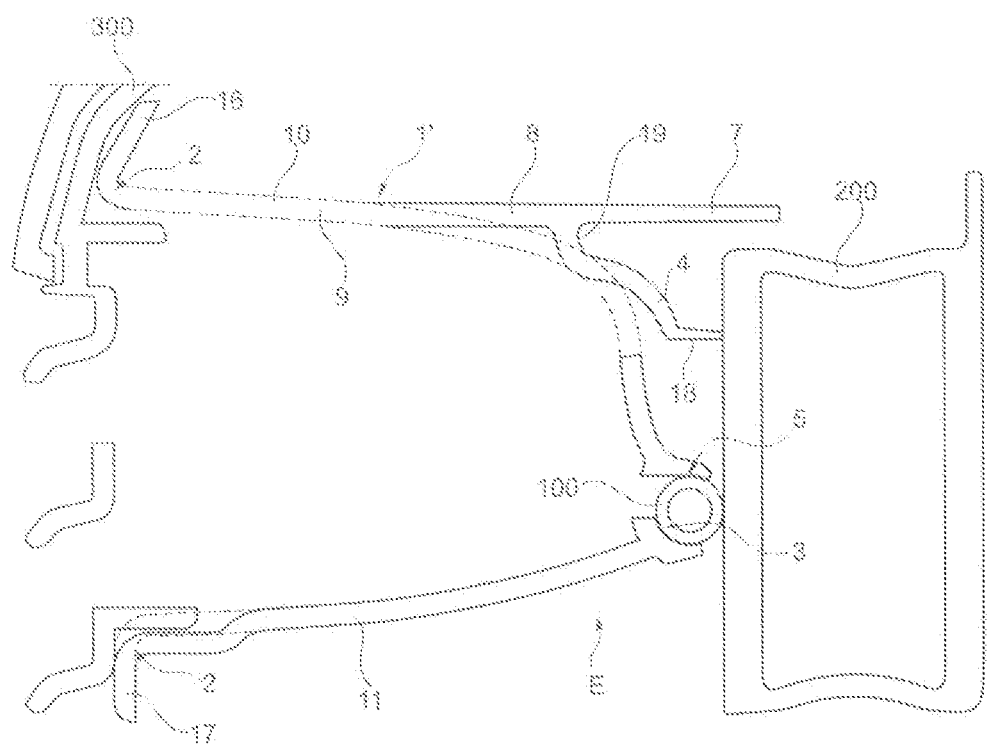
FIG. 3 shows a cross-sectional representation of another potential embodiment of a molding for a motor vehicle for transmitting an impact force to a hood sensor in its installation position on a motor vehicle.
Figure 4:
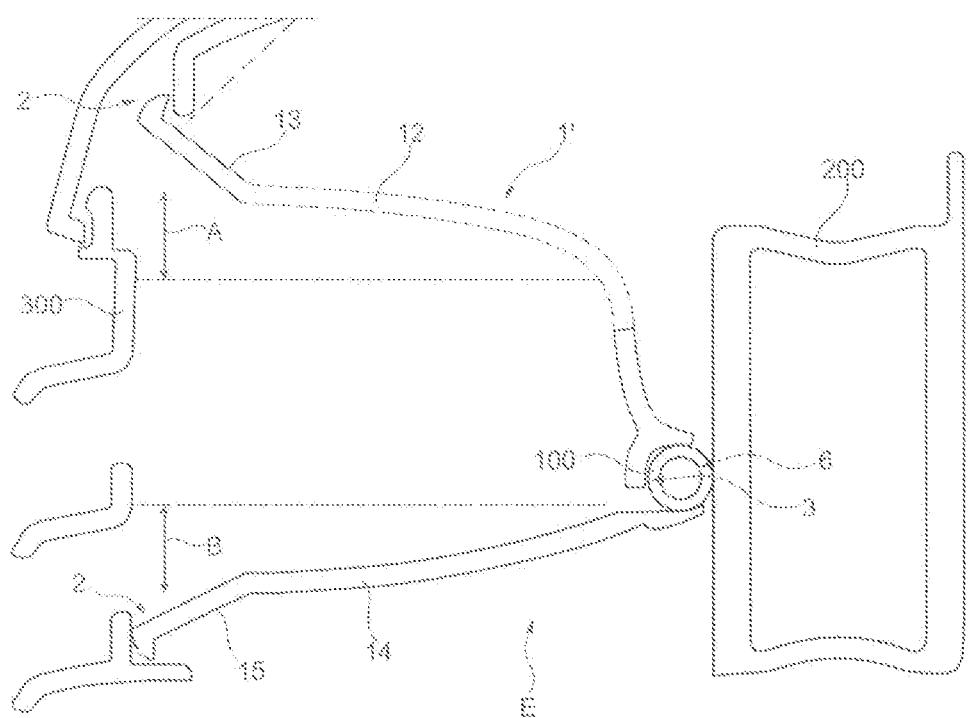
FIG. 4 shows another cross-sectional representation of the molding according to FIG. 3 in its installation position on the motor vehicle.

FIGS. 3 and 4 show another potential embodiment of a molding 1' together with a hood sensor 100 in an installation position E. Material sections of the molding 1' according to FIGS. 3 and 4, which are identical or function identically to the material sections of the molding 1 according to FIGS. 1 and 2, are identified by the same reference symbols. In this respect, the description of the molding 1 according to FIGS. 1 and 2 is referenced herein.

FIGS. 3 and 4 respectively show a cross section through the molding 1', wherein the molding 1' is illustrated in the form of a section through the elastically movable material section 4 in FIG. 3. FIG. 4 shows a section through the molding 1' between two elastically movable material sections 4. In the installation position E, the molding 1' is positioned between a vehicle body component 200 and a vehicle component 300, wherein the molding effectively contacts the vehicle component 300 with its absorption area 2 and effectively contacts the vehicle body component 200 with its transmission section 3. The vehicle body component 200 includes a cross member of the bumper system. The vehicle component 300 may consist of an air inlet structure for the vehicle radiator such as, for example, a radiator grille. In the installation position E, the elastically movable material sections 4 are arranged in a deflected position such that the respective elastically movable material sections 4 are supported against the vehicle body component 200 with a pre-stressing force. In addition, the hood sensor 100 arranged on the transmission section 3 is brought in contact with the vehicle body component 200.

The hood sensor 100 is preferably formed by an elongate hollow body such as, for example, a hose, the housing of which consists of an elastic material, for example a rubbery-elastic material. The elastically movable material sections 4 and the hood sensor 100 therefore jointly act against the vehicle body component 200 in the form of a spring damper system that counteracts a potential noise development and/or transmission of vibrations while the motor vehicle is in motion or at least while the engine is running. The spring damper system is designed in such a way that the hood sensor 100 is not triggered by potential vibrations of the vehicle body component 200, but rather only when it is acted upon by an actual impact force.

FIG. 3, in particular, shows that the respective dimensionally stable material section 7 and the respectively associated elastically movable material section 4 may be integrally formed on a common base section 8 that is realized on a wall 9 of the molding 1'. The base section 8 may be respectively formed of the wall 9 such that an opening is produced in the wall 9 as illustrated in FIG. 2. The dimensionally stable material section 7 extends beyond the vehicle body component 200 with its end, wherein this dimensionally stable material section acts as a stop for the vehicle body component 200 when the molding 1' begins to rotate in case of a collision and therefore serves for securing the molding 1' from rotating. Consequently, the molding 1' essentially remains in its installation position E and can optimally fulfill its function as an energy absorber when a collision occurs.

FIG. 3 furthermore shows that the respective elastic material section 4 is essentially oriented in the same direction as the dimensionally stable material section 7 with its end 18 and supported against the vehicle body component 200. The elastically movable material section 4 may be realized in a curved fashion between the end section 18 and the transition 19 into the base section 8 such that this design also causes the elastically movable material section 4 itself to carry out an elastic deformation in this area in order to generate a pre-stressing force.

The receptacle 5 of the molding 1' with the hood sensor 100 accommodated therein is positioned underneath the dimensionally stable material section 7. The limbs 10 and 11 originate therefrom and are in a respective section provided with a slope 12 or 14, by means of which a convex curvature can be realized.

The slopes 12 and 14 therefore produce a clearance from an imaginary starting point on the bottom of the C-shaped cross section of the molding 1' toward the open end on the respective limbs 10 and 11, wherein the clearance promotes a folding deformation of the cross section in case of a collision. As an example, the clearances are respectively identified by the reference symbols A and B in FIG. 4.

The respective slope 12 or 14 is connected to another section that may be respectively formed by another slope 13 or 15 as illustrated, for example, in FIG. 4. Due to the slopes 13 and 15, the respective limb 10 or 11 extends in this area laterally outward as far as the absorption area 2 such that a stabilizing effect is achieved. The deformability in case of a collision and therefore the energy absorption capacity can be influenced with the slopes 12 and 14 of the respective limbs 10 and 11. The design of the slopes 13 and 15 furthermore makes it possible to influence the resistance of the molding 1' by thereby achieving a reinforcing or stabilizing effect.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A molding for a motor vehicle configured to transmit an impact force to a hood sensor, the molding having a hollow c-shape comprising:
   an absorption area on a distal end of the molding configured to absorb an impact force;
   a transmission section on a limb of the molding configured to transmit at least a portion of the impact force to a hood sensor;
   at least one elastically movable material section configured to generate a restoring force when the molding is arranged in its installation position; and
   a receptacle in a base of the molding configured to accommodate the hood sensor,
   wherein a material section is oriented in an effective direction of the transmission section such that the material section protrudes outward from the molding.

2. The molding according to claim 1, wherein the material section forms an integral part of the molding.

3. The molding according to claim 1, wherein the transmission section forms at least part of the receptacle, the receptacle being at least partially open and configured to accommodate the hood sensor for supporting the hood sensor against a vehicle body component in the installation position.

4. The molding according to claim 1 further comprising at least one dimensionally stabilized material section protruding laterally outward from the molding.

5. The molding according to claim 4, wherein the dimensionally stable material section and the elastically movable material section are integrally formed on a common base section which defines a wall of the molding.

6. The molding according to claim 1, wherein the hollow c-shape of the molding comprises an elongate profile having an open-ended hollow cross section, wherein the absorption area is provided on an open end of the hollow cross section and the elastically movable material section faces away from the open end.

7. The molding according to claim 6, wherein the open-ended cross section comprises at least two limbs which converge with a respectively predefined slope.

8. The molding according to claim 6, wherein the elongate profile comprises at least one of the absorption area and the transmission section extending continuously in a longitudinal direction.

9. The molding according to claim 1, wherein the molding is a plastic injection-molded part.

10. An assembly with a molding according to claim 1 and further comprising a hood sensor.

11. The assembly according to claim 10, wherein the hood sensor comprises an elastic material.

12. The assembly according to claim 10, wherein the assembly is configured to be arranged between a first vehicle body component and a second vehicle component and connectable to the second vehicle component in a manner for supporting the absorption area on the first vehicle body component under pre-stress with the elastically movable material section.

13. The assembly according to claim 12, wherein the hood sensor is configured to rest against the first vehicle body component.

14. A motor vehicle having an assembly according to claim 10 and further comprising a first vehicle body component and a second vehicle component wherein the molding is connected to the second vehicle component in a manner for supporting the absorption area on the first vehicle body component under pre-stress with the elastically movable material section.

* * * * *